United States Patent [19]
Vaglica et al.

[11] Patent Number: 6,125,404
[45] Date of Patent: Sep. 26, 2000

[54] DATA PROCESSING SYSTEM HAVING A PROTOCOL TIMER FOR AUTONOMOUSLY PROVIDING TIME BASED INTERRUPTS

[75] Inventors: John J. Vaglica; Paul McAlinden, both of Austin, Tex.; Oded Norman, Pardesia, Israel; Moshe Refaeli, Hod Hasharon, Israel; Yoram Salant, Rosh-Haain, Israel; Thomas E. Oberhauser, Algonquin; Arvind Singh Arora, Chicago, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/061,958

[22] Filed: Apr. 17, 1998

[51] Int. Cl.$^7$ .................................................. G06F 13/372
[52] U.S. Cl. ........................... 709/400; 712/35; 712/244; 713/502
[58] Field of Search ..................... 709/101, 107, 709/108, 230, 400; 710/260, 266; 712/32, 34, 35, 43, 244; 713/320, 323, 324, 500, 502; 714/55

[56] References Cited

U.S. PATENT DOCUMENTS

| | | | |
|---|---|---|---|
| 4,758,945 | 7/1988 | Remedi | 364/200 |
| 5,053,943 | 10/1991 | Yokoyama | 713/502 |
| 5,072,444 | 12/1991 | Breeden et al. | 370/235 |
| 5,204,957 | 4/1993 | Wilkie et al. | 712/38 |
| 5,577,237 | 11/1996 | Lin | 713/500 |
| 5,606,714 | 2/1997 | Intrater et al. | 712/43 |
| 5,638,054 | 6/1997 | Davis et al. | 340/825.44 |
| 5,640,538 | 6/1997 | Dyer et al. | . |
| 5,910,944 | 6/1999 | Callicotte et al. | 370/311 |
| 5,917,854 | 6/1999 | Taylor et al. | 375/222 |

OTHER PUBLICATIONS

TPU Time Processor Unit Reference Manual, Section 1 Overview, pp. 1–1 to 1–6, (1990).

Intel Microcontroller Handbook, "16–Bit Microcontroller," pp. 15–37 to 15–39, (1983).

*Primary Examiner*—Viet D. Vu
*Attorney, Agent, or Firm*—Daniel D. Hill; Robert L. King; Paul J. Polansky

[57] ABSTRACT

A communications system includes multiple processors (14, 16) and a protocol timer (18). The protocol timer (18) controls the timing of events in the communications system and operates autonomously after it is loaded with initial instructions by one of the multiple processors (14, 16). The protocol timer (18) utilizes a frame event table (50) and a macro event table (46, 48) to trigger events and to generate interrupts of the multiple processors (14, 16). By allowing the protocol timer (18) to operate autonomously, the processors (14, 16) are relieved of timing control, and can be powered down when not in use, thus reducing power consumption of the communications system. Also, by using the protocol timer (18) to control the timing of events, software related errors and interrupt latencies are reduced.

21 Claims, 3 Drawing Sheets

DATA PROCESSING SYSTEM HAVING A PROTOCOL TIMER FOR AUTONOMOUSLY PROVIDING TIME BASED INTERRUPTS

FIELD OF THE INVENTION

The present invention relates in general to communications, and more particularly to a communication system having a protocol timer.

BACKGROUND OF THE INVENTION

Time division multiple access (TDMA) communication systems share a common transmission medium between a number of simultaneous users. Each user's transmission does not interfere with that of the other users because their transmissions are separated from each other in time. A requirement of an effective TDMA communications device, such as a cellular telephone, is that the device retain accurate time synchronization with respect to the other users.

Base stations in a GSM cellular phone system may not be synchronized with each other. When a mobile handset moves from one base station's coverage area to another, the handset must be re-synchronized with the new base station's time base. The transition must be handled in a timely manner to prevent a loss of information. Prior art techniques for retaining accurate time synchronization rely on a combination of software and hardware. These techniques suffer from timing errors and inhibit effective power management of the system. The timing errors result from errors introduced by software interaction with hardware, such as for example, interrupt latencies that delay software response to boundary conditions in the hardware. Also, uncertainties may be introduced when hardware counters are modified by software. Correcting these errors requires increased software complexity. In addition, power consumption may be higher than desirable because the system's central processing unit (CPU) must remain in an active state to execute the software component of the timing. Prior art techniques overcome these issues in hardware but require relatively large surface area on an integrated circuit to implement.

Therefore, the need exists for a communications system that eliminates the timing errors and decreases power consumption without increasing surface area on the integrated circuit, and the software which executes in the system is relatively easy to implement.

DETAILED DESCRIPTION OF THE DRAWINGS

Figure 1:
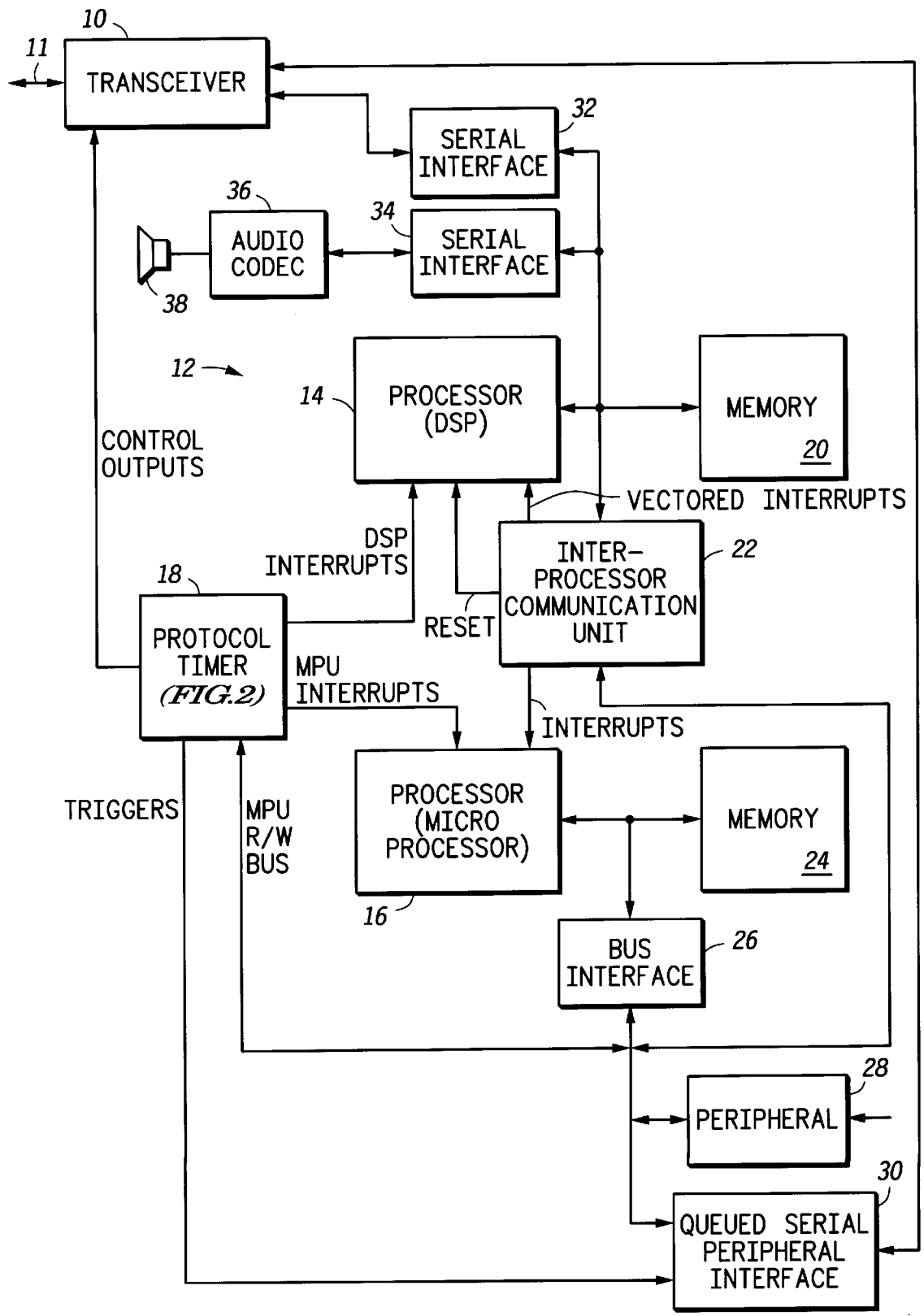
FIG. 1 illustrates, in block diagram form, a communications system having a protocol timer in accordance with the present invention.

Generally, the present invention provides a communications system that includes multiple data processors and a protocol timer. The protocol timer controls the timing of events in the communications system and operates autonomously after it is loaded with initial instructions. Also, the protocol timer can provide multiple vectored interrupts to the multiple data processors. By allowing the protocol timer to operate autonomously, the other processors can be powered down when not in use, thus reducing power consumption of the communications system. Also, by using the protocol timer to control the timing of events, the number of software related errors are reduced.

The term "bus" will be used to refer to a plurality of signals or conductors which may be used to transfer one or more various types of information, such as data, addresses, control, or status. Although the term "pin" is used throughout this document, this term is intended to encompass any type of apparatus which allows electrical signals to be transferred to or from an integrated circuit, such as, for example, integrated circuit bonding pads, solder bumps, wire conductors, etc.

In the following description, numerous specific details are set forth to provide a thorough understanding of the present invention. However, it will be obvious to those skilled in the art that the present invention may be practiced without such specific details. In other instances, circuitry has been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates, in block diagram form, a communications system having multiple processors and a protocol timer 18 in accordance with the present invention. The communications system includes transceiver 10, serial interface 32, serial interface 34, audio codec 36, speaker 38, and multi-processor data processing system 12. Data processing system 12 includes data processor 14, data processor 16, protocol timer 18, memory 20, inter-processor communication unit 22, memory 24, bus interface 26, peripheral unit 28, and queued serial peripheral interface (QSPI) 30. Note that transceiver 10, serial interfaces 32 and 34, audio codec 36, and speaker/microphone 38 form a "front end" for the communication system illustrated in FIG. 1. Peripheral unit 28 may be one of many types of peripheral units, and may include additional memory, serial and/or parallel interface units, digital-to-analog converters, and the like.

Transceiver 10 is bi-directionally coupled to a transmission path 11 for receiving and/or providing data organized in frames. Data received from transmission path 11 is provided to serial interface 32. Serial interface 32 and serial interface 34 are bi-directionally coupled to processor 14. Note that in the illustrated embodiment processor 14 is a digital signal processor (DSP) and processor 16 is a microprocessor (MPU). Processor 14 is bi-directionally coupled to memory 20. Memory 20 can be any type of volatile or nonvolatile random access memory. Serial interface 34 is also bi-directionally coupled to an audio codec 36. Audio codec 36 receives and delivers audio information from and to speaker/microphone 38. Audio codec 36 converts the received audio information to a digital format, and provides the digital audio information to serial interface 34. Processor 16 is bi-directionally coupled to memory 24 and to bus interface 26. Bus interface 26, peripheral unit 28 and QSPI 30 are all coupled to the MPU bus. In the illustrated embodiment, protocol timer 18, and processors 14 and 16 are implemented on the same integrated circuit. However, in other embodiments, more than one integrated circuit may be used.

Protocol timer 18 has a first plurality of output terminals for providing interrupts, labeled "DSP INTERRUPTS", to an interrupt input of data processor 14, a second plurality of output terminals for providing interrupts, labeled "MPU INTERRUPTS", to an interrupt input of data processor 16, a third plurality of output terminals for providing control signals, labeled "TRIGGERS", to QSPI 30, and a fourth plurality of output terminals for providing control signals, labeled "CONTROL OUTPUTS", to transceiver 10. Also, protocol timer 18 is bi-directionally coupled to processor 16 via a read/write bus labeled "MPU R/W BUS" and bus interface 26.

Inter-processor communication unit 22 has a first plurality of output terminals for providing interrupts, labeled "VECTORED INTERRUPTS", to processor 14, and a second plurality of output terminals for providing interrupts, labeled "INTERRUPTS", to processor 16. Also, inter-processor communication unit 22 is coupled to processor 14 for providing a reset signal, labeled "RESET", for resetting processor 14. In addition, inter-processor communication unit 22 is bi-directionally coupled to bus interface 26, memory 20, and processor 14. Inter-processor communication unit 22 coordinates communications between processor 14 and processor 16, and with any other processors that may be included in data processing system 12. A portion of memory 20 is used as message storage space for inter-processor communication unit 22.

In operation, transceiver 10 receives a bit stream, comprising a plurality of serial bits, from transmission path 11. The plurality of bits are organized into frames of bits and comply with a particular signaling protocol, such as for example, the Global System for Mobile (GSM) communications standard which has been implemented in Europe. Serial interface 32 receives the bit stream from transceiver 10 and converts the bit stream into a form that can be used by data processing system 12, and/or placed in memory 20. Processor 14 receives the bit stream from serial interface 32. Also, serial interface 32 can provide the serial bit stream from memory 20 to transceiver 10 for transmission via transmission path 11. Serial interface 34 serves as an interface between memory 20 and audio codec 36. Audio codec 36 interfaces digital interface 34 with speaker/microphone 38 and includes an analog-to-digital converter.

Note that depending on the type of communications system, serial interface 32 may take various forms, and serial interfaces 34 and audio codec 36 may or may not be present. Also, note that the communication system illustrated in FIG. 1 is for use in a time division multiple access (TDMA) system such as GSM. However, the present invention is not limited to GSM and may be applied to any TDMA system, either wireline or wireless.

Processor 14 receives the bit stream serial interface 32, and performs low level processing on the bit stream in accordance with the applicable protocol. Also, processor 14 multiplexes and demultiplexes the payload and control information from the bit stream and provides the control information to processor 16 via inter-processor communication unit 22. Processor 14 transfers the payload information to and from serial interface 34 and audio codec 36. Processor 14 may also transfer the payload information to other input/output devices, as appropriate for the type of payload information, following further processing in accordance with the applicable protocol. The other input/output devices may be, for example, a data communications terminal or a fax machine. Memory 20 includes program and data storage space for use by processor 14.

Generally, processor 16 receives and sends control information to processor 14 via inter-processor communication unit 22. Memory 24 stores program and data information for use by processor 16. The program information stored in memory 24 is used by processor 16 to interpret the control information or data received from processor 14. The control information or data are interpreted by processor 16 in accordance with a specific protocol, such as for example, GSM. Processor 16 provides instructions to protocol timer 18 via bus interface 26 and the MPU R/W BUS. In addition, processor 16 provides instructions to QSPI 30. Based on the instructions from processor 16, QSPI 30 provides control instructions to transceiver 10. Also, based on the instructions from processor 16, protocol timer 18 provides CONTROL OUTPUTS to transceiver 10 for controlling timing of the operation of transceiver 10. TRIGGERS may also be provided to other peripherals, such as peripheral 28.

After instructions have been initially loaded into protocol timer 18 by processor 16, protocol timer 18 operates autonomously providing CONTROL OUTPUTS to transceiver 10, control signals TRIGGERS to QSPI 30, and interrupts to both processor 14 and processor 16. During operation, the events are alterable by processor 16. The interrupts cause the interrupted processor, either processor 14 or processor 16, to be interrupted from executing a current address to begin executing a selectable target address. Note that in the illustrated embodiment, processor 16 initially loads the instructions. However, in other embodiments, processor 14, or another processor, not shown, may load the instructions.

Generally, protocol timer 18 includes a plurality of stored event codes, and upon a match between a predetermined count value associated with an event, and a reference time value, protocol timer 18 causes a predetermined control function to occur. The event code can cause any of: (1) one of processors 14 or 16 to receive an interrupt signal; (2) generation of a control signal for use in the communication system, such as in transceiver 10; (3) triggering of an event in a peripheral of the system; (4) control of flow of event recognition in protocol timer 18; or (5) controlling initiation of event recognition in the one or more comparators of protocol timer 18. The target address of an event, such as for an interrupt, is selectable, based on the event code stored in protocol timer 18.

Protocol timer 18 relieves processor 16 of all communications system timing control duties, including the generation of the interrupts. Protocol timer 18 generates timing information including the reference time value, and based on the timing information, provides the TRIGGERS to QSPI 30 and the CONTROL OUTPUTS to transceiver 10. The TRIGGERS cause QSPI 30 to transfer control bits to control the operation of transceiver 10. Also, based on the timing information generated by protocol timer 18, protocol timer 18 generates multiple vectored interrupts MPU INTERRUPTS to processor 14 and interrupts DSP INTERRUPTS to processor 16. Protocol timer 18 will be discussed later in connection with the discussion of FIG. 2.

By operating autonomously after being programmed, protocol timer 18 provides several advantages over prior art communication systems. For example, processors 14 and 16 are relieved of providing timer information and can then be used exclusively for their main processing tasks. Also, because processors 14 and 16 are not required to execute the software component of system timing, the processors can maximize the time they operate in a low power mode, thus reducing power consumption. In addition, many of the software based timing errors in the prior art are eliminated because protocol timer 18 does many of the timing functions once controlled by software executed on a CPU.

Figure 2:
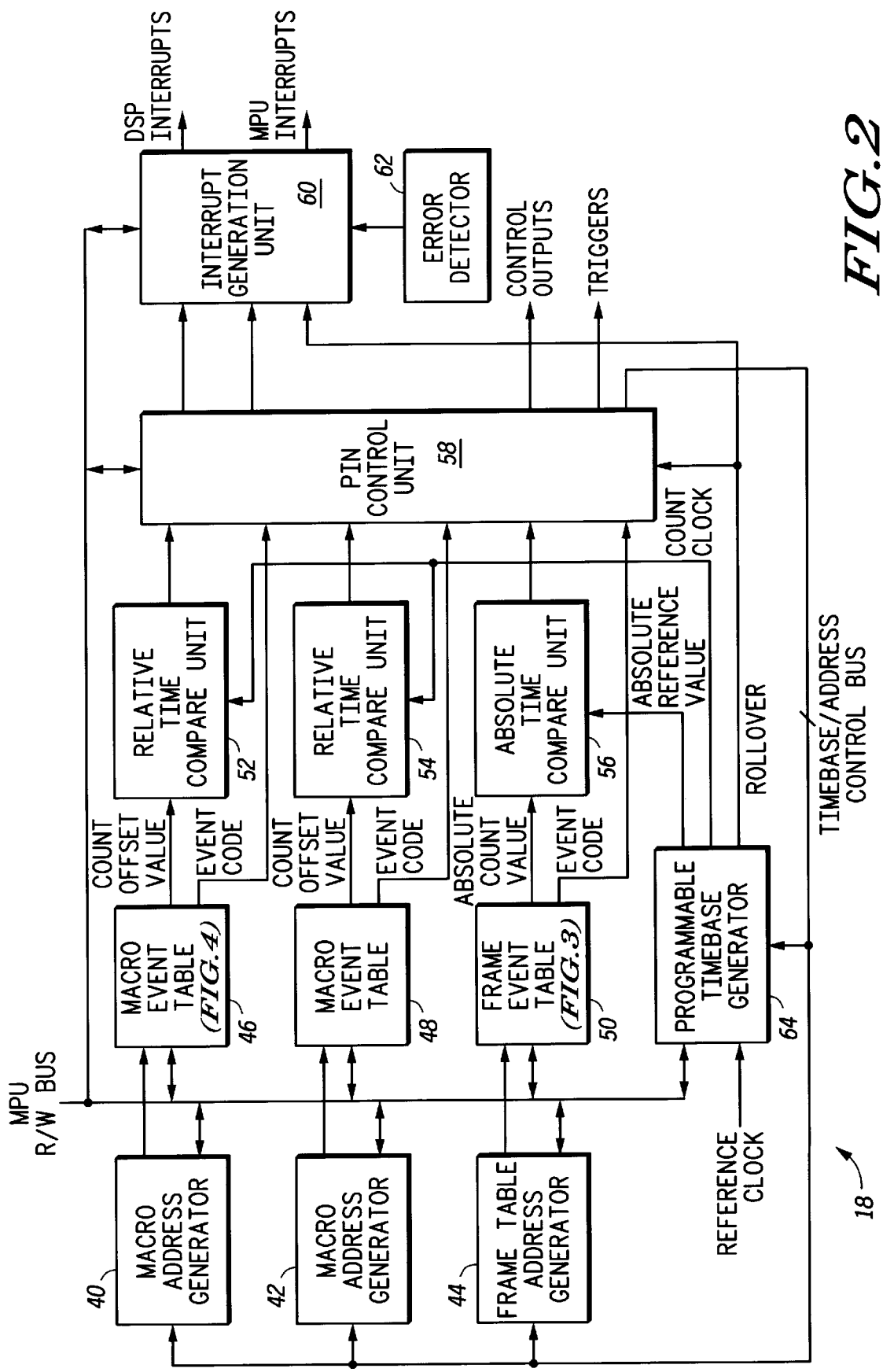
FIG. 2 illustrates, in block diagram form, protocol timer of the communication system of FIG. 1 in more detail.

FIG. 2 illustrates, in block diagram form, protocol timer 18 of the communications system of FIG. 1. Protocol timer 18 includes address generators 40, 42 and 44, macro event tables 46 and 48, frame event table 50, compare units 52, 54 and 56, pin control unit 58, interrupt generator 60, error detector 62, and programmable time base generator 64.

MPU R/W BUS bi-directionally couples processor 16 of FIG. 1 to macro address generator 40, macro address generator 42, frame table address generator 44, macro event table 46 and 48, frame event table 50, programmable time base generator 64, pin control unit 58, and interrupt generation unit 60. In the illustrated embodiment, event tables 46, 48 and 50 are implemented in random access memory. Event table 46 is addressed by address generator 40, event table 48 is addressed by address generator 42, and event table 50 is addressed by address generator 44. The addresses are initially generated from the information received from the MPU R/W BUS and are incremented and updated by pin control unit 58. Pin control unit 58 and programmable timebase generator 64 are coupled to address generators 40, 42 and 44 via a bus labeled "TIME BASE/ADDRESS CONTROL BUS". Programmable time base generator 64 receives a clock signal, labeled "REFERENCE CLOCK", and generates a signal labeled "ROLLOVER", a count value labeled "ABSOLUTE REFERENCE VALUE" and a clock signal labeled "COUNT CLOCK".

Relative time compare unit 52 has a plurality of input terminals for receiving an offset value labeled "COUNT OFFSET VALUE" from macro event table 46, and a second plurality of input terminals for receiving the clock signal COUNT CLOCK from programmable time base generator 64. Relative time compare unit 52 counts consecutive COUNT CLOCK pulses until the COUNT OFFSET VALUE is reached. Relative time compare unit 52 then provides an output signal to pin control unit 58 indicating that pin control unit 58 is to receive an event code labeled "EVENT CODE" from event table 46. Note that event table 46 is illustrated in more detail in FIG. 4.

Relative time compare unit 54 has a first plurality of input terminals for receiving an offset value labeled "COUNT OFFSET VALUE" from macro event table 48, and a second plurality of input terminals for receiving the clock signal COUNT CLOCK. Relative time compare unit 54 counts consecutive COUNT CLOCK pulses until the COUNT OFFSET VALUE is reached. Relative time compare unit 54 then provides an output signal to pin control unit 58 indicating that the EVENT CODE from event table 48 is to be loaded.

Absolute time compare unit 56 has a first plurality of input terminals for receiving an absolute count value labeled "ABSOLUTE COUNT VALUE" from frame event table 50, and a second plurality of input terminals for receiving count value ABSOLUTE REFERENCE VALUE from programmable time base generator 64. As the ABSOLUTE REFERENCE VALUE decreases, an output signal is provided by absolute time compare unit 56 when the ABSOLUTE COUNT VALUE from event table 50 is equal to the ABSOLUTE REFERENCE VALUE, indicating that the EVENT CODE from event table 50 is to be loaded into pin control unit 58.

Based on the value of the EVENT CODE, pin control unit 58 causes interrupt generation unit 60 to provide either DSP INTERRUPTS to processor 14 or MPU INTERRUPTS to processor 16, or pin control unit 58 may provide CONTROL OUTPUTS to transceiver 10, or TRIGGERS to QSPI 30. Protocol timer 18 may generate multiple interrupts to multiple CPUs. In addition to interrupts being generated in response to the compare unit outputs, interrupt generation unit 60 also receives control signals from error detector 62 and will generate appropriate interrupts based on the type of error detected. For example, if error detector 62 detects inconsistent programming and/or illegal states, an interrupt will be generated.

Programmable time based generator 64 includes a programmable down counter that counts from a predetermined value to zero. Upon reaching zero, the programmable down counter repeats counting from the predetermined value. For GSM applications the programmable counter is characterized as a modulo 5000 counter. Note that for use in other TDMA applications, such as for example, Asymmetrical Digital Subscriber Line (ADSL), the programmable time based modulo counter may be programmed for other count values. In response to the modulo 5000 counter reaching the count of zero, control signal ROLLOVER is provided to interrupt generation unit 60 and to pin control unit 50. In response to receiving the ROLLOVER signal, pin control unit 50 resets frame table address generator 44, and interrupt generation unit 60 may be programmed to provide an interrupt to processor 14 or processor 16.

In response to a favorable comparison between ABSOLUTE COUNT VALUE and ABSOLUTE REFERENCE VALUE within absolute time compare unit 56, the pin control unit 58 may, based upon the event code within frame event table 50, direct a "macro" event to be executed. A macro is a sequence of instructions for performing one or more communications operations in the communications system. A macro event will be executed from one of macro event table 46 or macro event table 48 under the control of macro address generator 40 or 42, respectively. Protocol timer 18 can recognize a plurality of macro events occurring simultaneously, or in parallel, and can implement multiple control functions in the communications from the macro event tables. While protocol timer 18 is implementing control functions, one or both of processors 14 and 16 can be in a low power mode of operation.

The interrupt signals VECTORED INTERRUPTS, that are provided to processor 16, and the interrupt signals INTERRUPTS, that are provided to processor 14, are generated by inter-processor communication unit 22 using event table information. The event table information is provided to inter-processor communication unit 22 via the MPU R/W BUS.

When a mobile cellular telephone is transitioning from one GSM base station, operating from one time base, to another GSM base station operating from another time base, re-synchronization from the one time base to the other is required. The re-synchronization is triggered by the protocol timer 18 using the event tables as described above. Because software execution on an MPU is not used for triggering time-critical tasks, such as base station handoff, time-critical tasks scheduling may be handled more efficiently.

Figure 3:
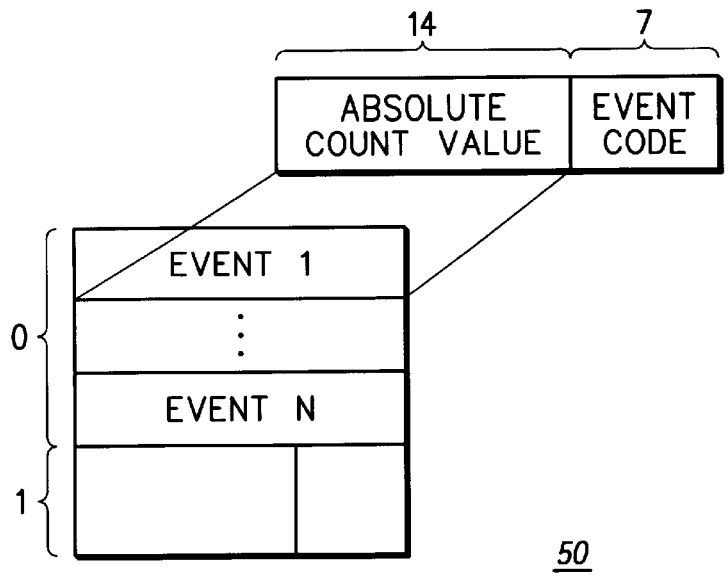
FIG. 3 illustrates, in block diagram form, the frame event table of FIG. 2 in more detail.

FIG. 3 illustrates frame event table 50 in more detail. Frame event table 50 includes a plurality of storage regions, or sections. Each section contains a number of entries. Frame event table 50 includes two sections, labeled with "0" and "1" on the left side of the table. Both sections have substantially the same organization and are for storing a predetermined number of event operation codes. One of the sections is active while the other section is in standby. The inactive section may be activated by protocol timer 18 dynamically switching to the inactive section in response to recognition of one or more predetermined events. Each frame entry, or event, includes a bit field (14-bits) for storing an absolute count value, or time stamp, and a bit field (7-bits) for storing the event operation code. Frame events are implemented based on absolute time, and macro events are implemented based on relative time.

The event codes stored within frame event table 50 are for processing the frames of data in accordance with the applicable protocol, such as for example, GSM. A list of example operation codes are included below, and are for illustration purposes only.

Frame Event Table

| Absolute Count Value | Event Operation Code | Comments |
|---|---|---|
| 5000 | MCU_Int0 | Prepare MCU for Burst RX |
| 4900 | DSP_Int0 | Prepare DSP for Burst RX |
| 4800 | RX_Macro(burst_rx_delay) | Do Burst Receive |
| 4600 | DSP_Int8 | DSP prepare TX Burst |
| 4300 | MCU_Int1 | Prepare MCU for Burst TX |
| 4200 | TX_Macro(burst_tx_delay) | Do Burst Transmit |
| 4000 | DSP_Int1 | RX Complete - Process Burst |
| 3400 | MCU_Int2 | Prepare MCU for Adjacent Cell RX |
| 3350 | DSP_Int4 | Prepare DSP for Adjacent Cell RX |
| 3200 | DSP_Int9 | TX Complete |
| 3000 | RX_Macro(adjacent_rx_delay) | Do Adjacent Cell Receive |
| 2600 | MCU_Int2 | Prepare MCU for Adjacent Cell RX |
| 2500 | DSP_Int5 | Adjacent Cell RX Complete - Process |
| 2499 | RX_Macro(adjacent_rx_delay) | Do Adjacent Cell Receive |
| 2100 | MCU_Int2 | Prepare MCU for Adjacent Cell RX |
| 2000 | DSP_Int5 | Adjacent Cell RX Complete - Process |
| 1999 | RX_Macro(adjacent_rx_delay) | Do Adjacent Cell Receive |
| 1500 | DSP_int6 | Last Adjacent Cell RX Complete - Process |
| 1001 | DSP_int15 | Enter Low power mode |
| 1000 | End_of_frame_repeat | Wait until counter rollover and repeat |

Because many of the events necessary for processing data are similar to each other, those events can be collected and stored as one macro event. For example, events for receive bursts of data and for adjacent cell power measurements are similar and can each be represented with one macro. By collecting events into macros, event tables can be smaller, thus requiring less memory space in the data processing system. Also, organizing a number of events as macros allows events and macros to be executed in parallel. The ability to execute events and macros in parallel may be important, for example, when it is necessary to begin preparing for a transmit operation before a receive operation has ended.

As illustrated in the frame event table above, some of the event operation codes refer to macros, such that the macro directs pin control unit 58 to begin executing one of the macros stored in macro event tables 46 and/or 48. As discussed above, and illustrated in FIG. 2, macro event table execution is based on programmable offsets rather than absolute count values from programmable time base generator 64. Each time a macro is listed, an offset is required for macro event timing. The amount of offset is programmable and is indicated in the Frame Event Table above by including a "delay" in parentheses following the event operation code. Macro event tables 46 and 48 each include delay buffers for storing the programmable offset delays within the macro sequences. In addition to determining which macro event to use, frame event table 50 is also used to specify which delay buffer entry to use with a particular macro event.

Figure 4:
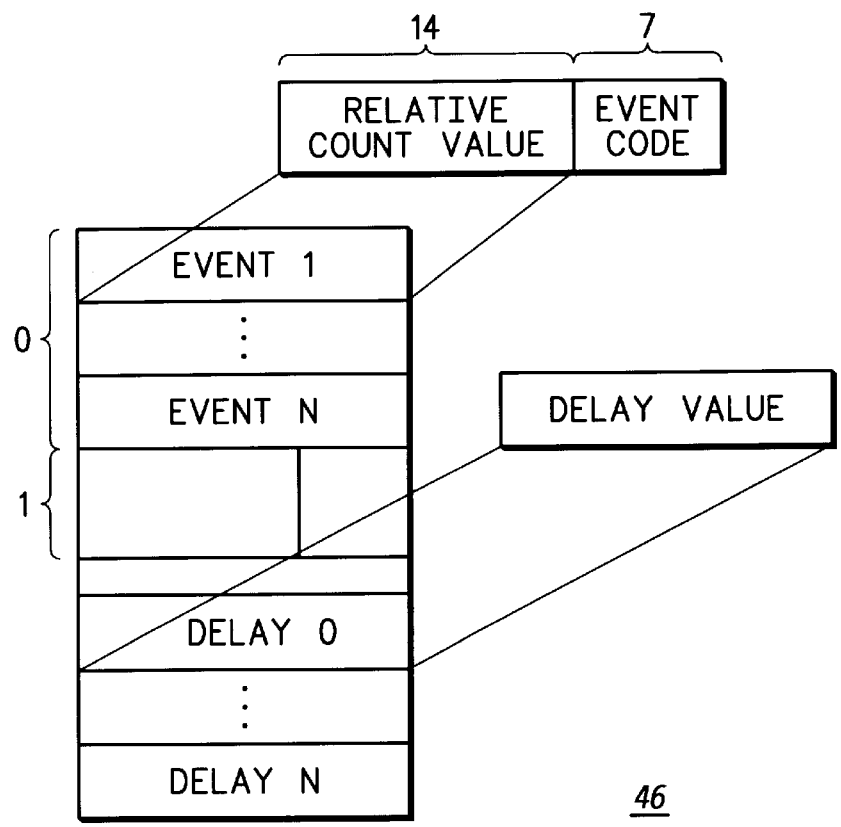
FIG. 4 illustrates, in block diagram form, the macro event table of FIG. 2 in more detail.

FIG. 4 illustrates, in block diagram form, the macro event table 46 of FIG. 2 in more detail. Like frame event table 50, macro event table 46 includes a plurality of sections. Each section contains a number of entries. Macro event table 46 includes two sections, labeled with "0" and "1" on the left side of the table. Both sections have substantially the same organization and are for storing a predetermined number of macro operation codes. Each entry, or event, includes a bit field (14-bits) for storing an relative count value, or time stamp, and a bit field (7-bits) for storing the event operation code. Also, illustrated in FIG. 4 are the delay buffers for storing the programmable offset delay values. The offsets are based on the relative count value, and each macro can choose from multiple delays. The offset values are selectable, and can be used to change the sequence of events without changing the relative timing relationship of other subsequent events that are based on the same relative count value. For illustration purposes, the table below includes two examples of a macro, a receive (RX) macro and a transmit (TX) macro, as used above in the Frame Event Table of FIG. 3.

Macro Event Table (RX Macro)

| Count Offset Value | Event Operation Code | Comments |
|---|---|---|
| +0 | Trigger QSFI Queue 0 | Program synth/pll with RX frequency |
| +10 | Assert RX_OSC_On | Turn on receive oscillator |
| +180 | Assert RX_On | Turn on receiver |
| +10 | Assert RX_Enable | Begin to receive samples |
| +10 | Delay | Wait length of frame |
| +1 | Negate RX_Enable | Stop receiving samples |
| +0 | Negate RX_On | Turn off RX circuits |
| +0 | Negate RX_OSC_On | |
| +0 | End_of_macro | |

Macro Event Table (TX Macro)

| Count Offset Value | Event Operation Code | Comments |
|---|---|---|
| +0 | Trigger QSPI Queue 1 | Program synth/pll with TX frequency |
| +10 | Assert TX_OSC_On | Turn on transmit oscillator |
| +180 | Assert PA_On | Turn on RF Power Amplifier |
| +10 | Assert TX_On | Turn on rest of transmitter |
| +10 | Assert TX_Enable | Begin to transmit samples |
| +1 | Delay | Wait length of frame |
| +0 | Negate TX_Enable | Stop transmitting samples |
| +0 | Negate TX_On | Turn off TX circuits |
| +0 | Negate TX_OSC_On | |
| +0 | Negate TX_On | |
| +0 | End_of_macro | |

The use of multiple event tables allows parallel event execution. Therefore, the need for providing content addressable memory (as in some prior art systems) for parallel event execution is eliminated. In addition, by generating interrupts from event tables 46, 48 and 50, the interrupts are programmable at precisely controlled intervals or points in time, which is important in real time processing applications. Also, by using the event tables, protocol timer 18 may generate multiple interrupts to multiple CPUs. In addition, the use of macro event tables also reduces the amount of storage area needed to store frame events, and the delay buffers allow a macro to be reused for similar operations at different times in the bit stream. Further, the use of macro event tables allow an overlap of event timing sequences and the movement of those sequences relative to each other without requiring that the event table be sorted or reordered. Also, unlike prior art systems, the use of software is limited to pre-sorting of event entries by time stamping the event codes, and is thus, relatively easy to implement.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A data processing system comprising:
    a first data processor for communicating and processing information, the first data processor having an interrupt input for receiving a first interrupt signal, which causes the first data processor to be interrupted from executing a current address to a selectable target address;
    a second data processor for communicating and processing other information, the second data processor also having an interrupt input for receiving a second interrupt signal, which causes the second data processor to be interrupted; and
    a timer having a first output coupled to the first data processor and a second output coupled to the second data processor, the timer autonomously generating the first interrupt signal at the first output thereof and the second interrupt signal at the second output thereof in response to stored values which determine timing of the first and second interrupt signals, wherein the timer comprises a timebase generator and uses an output of the time base generator to generate both the first interrupt signal and the second interrupt signal, wherein the timebase generator is programmable by at least one of the first and second data processors.

2. The data processing system of claim 1 further comprising:
    an absolute time comparator for receiving an absolute time value to compare with an absolute reference time value;
    the timebase generator coupled to the absolute time comparator, for providing an absolute count value for the absolute time comparator; and
    a plurality of stored events, each of the stored events specifying an event code upon detection of a match in the absolute time comparator, the event code causing a predetermined control function to occur.

3. The data processing system of claim 1 further comprising:
    one or more relative time comparators, each receiving a respective predetermined relative time value to compare with a respective relative reference time value;
    the timebase generator coupled to the one or more relative time comparators, the timebase generator providing a reference clock to one or more relative time comparators;
    a plurality of stored events, each of the plurality of stored events specifying an event code upon a match in the one or more relative time comparators, the event code causing a predetermined control function to occur.

4. The data processing system of claim 1 further comprising:
    one or more comparators for receiving a time value to compare with a reference time value;
    the timebase generator coupled to the one or more comparators, the timebase generator providing a reference which is either a clock signal or a count value to the one or more comparators; and
    a storage device containing a plurality of events, each event specifying an event code upon a match in the one or more comparators, the event code causing a predetermined control function to occur.

5. The data processing system of claim 4 wherein the event code can cause any of: (1) one of the first or second processors to receive an interrupt signal; (2) generation of a control signal for use in the data processing system; (3) triggering of an event in a peripheral of the system; (4) control of flow of event recognition in the timer; or (5) controlling initiation of event recognition in the one or more comparators.

6. The data processing system of claim 1 wherein the target address is programmable based upon an event contained in an event code stored in the timer.

7. The data processing system of claim 1 wherein one of the first data processor or the second data processor programs a predetermined one of the stored values which is subsequently used to define where instruction flow for the other data processor will be directed upon interruption.

8. The data processing system of claim 1 wherein the stored values in the timer are generated and provided by only one of the first data processor or the second data processor.

9. A data processing system comprising:
    a first data processor for communicating and processing information, the first data processor having an interrupt input for receiving a first interrupt signal, which causes the first data processor to be interrupted from executing a current address to a selectable target address;
    a second data processor for communicating and processing other information, the second data processor also having an interrupt input for receiving a second interrupt signal, which causes the second data processor to be interrupted; and
    a timer having a first output coupled to the first data processor and a second output coupled to the second data processor, the timer autonomously generating the first interrupt signal at the first output thereof and the second interrupt signal at the second output thereof in response to stored values which determine timing of the first and second interrupt signals, wherein the timer comprises a timebase generator and uses an output of the time base generator to generate both the first interrupt signal and the second interrupt signal,
    wherein the stored values in the timer are stored in two storage regions, a first storage region representing absolute time events in the data processing system and a second storage region representing relative time events in the data processing system.

10. A data processing system comprising:
    a first data processor for communicating and processing information, the first data processor having an interrupt input for receiving a first interrupt signal, which causes the first data processor to be interrupted from executing a current address to a selectable target address;
    a second data processor for communicating and processing other information, the second data processor also having an interrupt input for receiving a second interrupt signal, which causes the second data processor to be interrupted; and a timer having a first output coupled to the first data processor and a second output coupled to the second data processor, the timer autonomously generating the first interrupt signal at the first output thereof and the second interrupt signal at the second output thereof in response to stored values which determine timing of the first and second interrupt signals, wherein the timer comprises a timebase generator and uses an output of the time base generator to generate both the first interrupt signal and the second interrupt signal, wherein the stored values in the timer are stored in two storage regions, a first storage region representing active stored values and the second storage region representing standby stored values, each of the active stored values and standby stored values representing an event to control in the data processing system, the timer dynamically switching between the first storage region and the second storage region in response to recognition of one or more predetermined events.

11. The data processing system of claim 1 wherein the timer recognizes a plurality of time relative events occurring simultaneously to concurrently implement multiple controlled functions in the data processing system.

12. The data processing system of claim 1 wherein at least one of the first data processor and the second data processor is in a low power mode of operation while the timer continues to operate on stored events to provide timed control functions for the data processing system, the stored events remaining valid during an entire time period that the at least one of the first data processor and the second data processor is in a low power mode.

13. A data processing system comprising:

a first data processor for communicating and processing information, the data processor having an interrupt input for receiving a first interrupt signal, which causes the first data processor to be interrupted from executing a current address to a target address;

a second data processor for communicating and processing other information, the second data processor also having an interrupt input for receiving a second interrupt signal, which causes the second data processor to be interrupted; and a timer coupled to the first data processor and to the second data processor, the timer autonomously generating both the first interrupt signal and the second interrupt signal in response to stored values which determine the timing of system interrupts, the timer further comprising:

an absolute time comparator for receiving an absolute time value to compare with an absolute reference time value;

one or more relative time comparators, each receiving a respective predetermined relative time value to compare with a respective relative reference time value;

a timebase generator coupled to the absolute time comparator and the one or more relative time comparators, for providing an absolute count value for the absolute time comparator and a reference clock to the one or more relative time comparators, wherein the timebase generator is programmable by the first data processor; and a plurality of stored events, each of the plurality of stored events specifying an event code upon a match in either the absolute time comparator or the one or more relative time comparators, the event code causing a predetermined control function to occur, wherein the timer uses an output of the timebase generator to generate both the first interrupt signal and the second interrupt signal.

14. The data processing system of claim 13 wherein the plurality of stored events are directly alterable by the first data processor once stored.

15. The data processing system of claim 13 further comprising a means to insert a selectable delay into a sequence of stored events without changing the relative timing relationship of subsequent events.

16. The data processing system of claim 13 wherein the plurality of stored events in the timer are stored in two storage regions, a first storage region representing absolute time events in the data processing system and a second storage region representing relative time events in the data processing system.

17. The data processing system of claim 13 wherein the stored events in the timer are stored in two storage regions, a first storage region representing active stored events and a second storage region representing standby stored events, each of the active stored events and standby stored events representing an event to control in the data processing system, the timer dynamically switching between the first storage region and the second storage region in response to recognition of one or more predetermined events.

18. The data processing system of claim 13 wherein the timer recognizes a plurality of time relative events occurring simultaneously to concurrently implement multiple controlled functions in the data processing system.

19. The data processing system of claim 13 wherein the data processor is in a low power mode of operation while the timer continues to operate on stored events to provide timed control functions for the data processing system, the stored events remaining valid during an entire time period that the data processor is in a low power mode.

20. A data processing system comprising first and second data processors having corresponding first and second interrupt input terminals respectively receiving first and second interrupt signals, and a timer including a timebase generator and first and second compare registers, the timer generating the first and second interrupt signals when the output of the timebase generator matches values respectively stored in the first and second compare registers, wherein the timebase generator is programmable by at least one of the first and second data processors.

21. The data processing system of claim 20 wherein the first and second data processors and the timer are all integrated on a single chip.

* * * * *